United States Patent [19]

Kunkle

[11] 4,048,038

[45] Sept. 13, 1977

[54] ELECTROFLOCCULATION CELL

[75] Inventor: Albert C. Kunkle, Macon, Ga.

[73] Assignee: J. M. Huber Corporation, Locust, N.J.

[21] Appl. No.: 689,632

[22] Filed: May 24, 1976

Related U.S. Application Data

[63] Continuation-in-part of Ser. No. 486,941, July 8, 1974, abandoned.

[51] Int. Cl.² .............................................. B01D 13/02
[52] U.S. Cl. ............................ 204/180 R; 204/299 R; 204/300 R
[58] Field of Search .................... 204/180 P, 299, 300, 204/180 R

[56] References Cited

U.S. PATENT DOCUMENTS

| | | | |
|---|---|---|---|
| 1,229,203 | 6/1917 | Schwerin | 204/180 R |
| 1,366,456 | 1/1921 | Highfield | 204/180 R |
| 1,435,886 | 11/1922 | Acton | 204/180 R |
| 3,642,605 | 2/1972 | Chenel et al. | 204/300 |

Primary Examiner—Arthur C. Prescott
Attorney, Agent, or Firm—August E. Roehrig, Jr.; Harold H. Flanders

[57] ABSTRACT

An electroflocculation cell for the separation of clay particles from an aqueous suspension thereof, the cell being equipped with an anode and cathode separated by a first semipermeable membrane impermeable to clay particles which divides the cell into anode and cathode compartments. A second semipermeable membrane is provided in the anode compartment spaced from the anode and the first membrane. Upon application of a direct current to the anode and cathode, clay particles in a suspension fed to the area of the cell between the first and second membranes deposit electrophoretically on the second membrane. By avoiding contact of the clay deposit with the anode, contamination of the deposit by anode corrosion products is thereby avoided.

27 Claims, 3 Drawing Figures

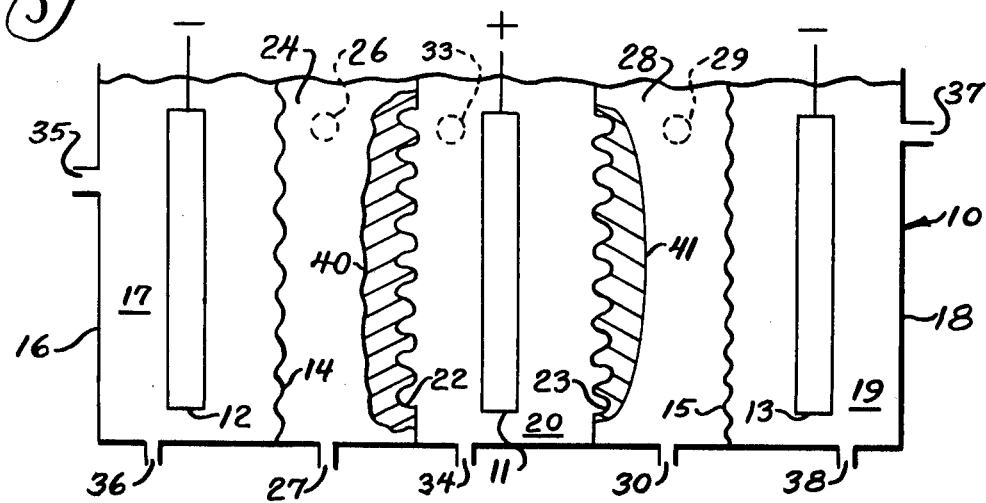

ELECTROFLOCCULATION CELL

REFERENCE TO RELATED APPLICATIONS

This application is a continuation-in-part of its parent Application Ser. No. 486,941, filed July 8, 1974, in the name of Albert C. Kunkle now abandoned.

BACKGROUND OF THE INVENTION

This invention relates to an apparatus for the separation of finely divided clay particles from aqueous suspensions thereof and, more particularly, to an electroflocculation cell wherein clay particle separation is effected with minimal contamination of the separated particles by the cell anode.

Clays such as kaolin, bentonite and the like are widely used as absorbents, pigments, catalysts, paper fillers and the like. These clays generally occur in geological deposits as mixtures with inert foreign materials, and it is necessary to separate the clay material before the clay is utilized in commercial applications.

In effecting the separation, the crude clay is dispersed in water with the aid of dispersing chemicals such as sodium silicate, sodium hexametaphosphate, sodium tripolyphosphate and tetrasodium pyrophosphate and the clay slurry is blunged, degritted, classified and leached to effect removal of the undesired foreign materials. Following these steps, the clay is filtered to remove the dispersing chemicals and to produce a solid filter cake containing 50% to 60% clay. This solids cake is then redispersed and spray dried or otherwise dried in the flocculated state. For various economic reasons, it is desirable in the clay industry to ship slurries containing 70% solids. Therefore, it is conventional in the clay art to add approximately 35% to 50% spray dried clay to a 50% to 60% solids redispersed filter cake to yield a 70% solids slurry. The addition of spray dried clay to clay filter cake to prepare a 70% solids slurry for shipment adds significantly to the cost of the shipped slurry due to the relatively high costs of preparing the spray dried clay. The art, therefore, has been continually seeking to effect methods whereby clay filter cakes containing 70% clay can be directly obtained from clay suspensions without the addition of spray dried clay.

Among the methods which the art has investigated in its attempt to obtain a more concentrated, i.e., 70% solids clay cake, has been the use of electrokinetic phenomenon such as electrophoresis and electroosmosis.

Most solid materials when suspended as fine particles in a liquid acquire an electric charge. By applying a DC (Direct Current) electric field between two electrodes immersed in the particle suspension, the particles are caused to travel toward one of the electrodes and form a deposit thereon. This travelling of solid particles through a liquid due to the application of DC is referred to in the art as electrophoresis. When under the influence of a direct current potential, water or other liquid medium is caused to migrate through a stationary porous diaphragm toward a charged electrode. This phenomenon is referred to in the art as electroosmosis. Both electrophoresis and electroosmosis have been applied to the separation of clays from aqueous suspensions thereof. When applied to aqueous clay suspensions, electrophoresis is generally used to effect the deposition of the suspended clay material on a charged electrode, whereas electroosmosis functions as an aid in consolidating and concentrating the electrophoretically deposited clay by removal of the entrained water from the deposit.

In copending application Ser. No. 532,660 there is disclosed an electrokinetic cell for the separation of clay suspensions, the cell being provided with an anode and cathode separated by a semi-permeable membrane impermeable to clay particles which divides the cell into anode and cathode compartments. Upon application of direct current to the anode and cathode, clay particles in a suspension fed to the anode compartment deposit electrophoretically on the anode. A portion of the water contained in the suspension and entrained in the deposit simultaneously migrates electroosmotically therefrom and through the membrane where it is collected in the cathode compartment and thereafter removed from the cell.

One disadvantage that has been encountered in the operation of this cell is that the materials from which the anode is constructed undergo corrosion and/or erosion during operation of the cell which causes foreign metal ions (e.g. lead ions) or particulate matters (such as carbon) to contaminate and reduce the brightness or otherwise discolor the clay particles deposited thereon, thereby rendering the clay deposit unacceptable for many of its intended commercial uses.

SUMMARY OF THE INVENTION

In accordance with the present invention, concentration of clay deposited on the anode of an electrokinetic clay separation cell is realized with a cell constructed of an anode and cathode, the anode and cathode being separated by a first semi-permeable membrane impermeable to the passage of clay particles, the anode forming an anodic compartment with the membrane and the cathode forming a cathode compartment with the membrane, there being provided in the anode compartment a second semi-permeable membrane spaced from the anode and the first membrane. Aqueous suspensions to be separated are fed to the anodic compartment in the area between the first and second membranes. When a direct current field is applied between the anode and cathode of the cell, solid particles are electrophoretically deposited on the second membrane. Means are provided to add acid or alkali electrolyte to the space between the anode and the second membrane to maintain electrical contact. Means are also provided to add acid electrolyte to the cathode compartment to enhance the electroosmotic removal of water from the deposited clay particles as well as to provide for the removal of water collected in the cathodic compartment.

By adding a predetermined amount of acid electrolyte to the anode compartment, an acid cake is caused to be deposited on the second membrane. When a predetermined amount of an alkali electrolyte is added to the anode compartment, a dispersed cake is caused to be deposited on the second membrane in the anode compartment, direct contact of the clay deposit with the anode is thereby avoided and contamination of the clay deposit with anode corrosion products is substantially eliminated.

BRIEF DESCRIPTION OF THE DRAWINGS

Objects of the invention, together with additional features contributing thereto and advantages accruing therefrom, will be apparent from the following description of several embodiments of the invention when read in conjunction with the accompanying drawings, wherein:

FIG. 1 is a schematic cross-sectional representation of one embodiment of an electroflocculation cell of the present invention wherein the anode of the cell is stationary;

FIG. 2 is a schematic cross-sectional representation of a second embodiment of an appartus of the present invention wherein the anode of the cell is rotated through a slurry of clay particles to be deposited; and FIG. 3 is a schematic cross-sectional detailed representation of a cathode structure which can be employed in the electroflocculation cell of FIG. 2.

PREFERRED EMBODIMENTS

Referring now to the drawings, FIG. 1 shows an electroflocculation cell 10 consisting of a solid anode 11 and cathodes 12, 13. Spaced from the anode 11 and cathodes 12, 13 are first semi-permeable membranes 14, 15. The anode and cathodes are connected to a source of DC, not shown. The first semi-permeable membrane 14 and the cell wall 16 form a first cathode compartment 17 containing the cathode 12 therein. The first semi-permeable membrane 15 and the cell wall 18 form a second cathode compartment 19. Located on either side of the anode 11, and spaced apart from the anode 11, are second membranes 22 and 23. Slurry compartment 24 is formed between first and second membranes 14 and 22 and is provided with inlet and outlet means 26, 27. Slurry compartment 28 is formed between first and second membranes 15 and 23 and is provided inlet and outlet means 29, 30. An anode or anolyte compartment 20 is formed between the second membranes 22, 23 and is provided with inlet and outlet means 33, 34 through which a predetermined amount of electrolyte, either caustic or acid, depending upon whether it is desired to produce dispersed or acid clay, respectively, is added. The separate cathode compartments 17 and 19 are also provided with inlet and outlet means 35, 36, 37, 38, through which a predetermined amount of acid solution is added for circulation through the cathode compartments.

In operation, a clay particle suspension to be electrokinetically separated is introduced into the cell 10 by an inlet means 26, 29 to the slurry compartments 24, 28. The electrolyte, either caustic or acid, is introduced into the anode or anolyte compartment 20. The acid solution is introduced into the cathode compartments 17 and 19. Upon activation of the cell with DC, solids deposits 40, 41 are electrophoretically deposited from the suspension onto the second membranes 22, 23. Water removed from the suspension and deposits 40, 41 migrate through first membranes 14 and 15 and is collected in the cathode compartments 17 and 19.

In FIGS. 2 and 3, the electroflocculation cell 50, as shown, consists of a rotatably mounted, hollow, electrically conductive drum anode 51, the rotation thereof being effected by a source of power not shown. Spaced apart, but concentric with the drum 51, is stationary, foraminous, arcuate cathode 52 which is mounted on and insulated from the upstanding walls of the tank 53. The anode 51 and the cathode 52 are connected to a source of DC which is not shown. Spaced apart and separating the anode 51 and the cathode 52 is an arcuate first semi-permeable membrane 55, also mounted on and insulated from the tank walls and concentric with the anode 51 and cathode 52. The fist membrane 55 is a flexible, tightly woven, porous fabric which is adapted to permit diffusion of water, but is impermeable to the passage of the solid particles.

Mounted on the anode 51, but spaced apart and insulated therefrom is a second membrane 57. The space between the first membrane 55 and the second membrane 57 forms and defines a slurry chamber 56 to which liquid inlet means 58 (any suitable conduit or tube of dielectric, non-corrodable materials, for example, rubber or glass) extends from a suitable supply source (not shown) to the slurry chamber 56. Liquid outlet means 59 are also provided to discharge electrokinetically treated suspension from the slurry chamber 56 and comprise a conduit or tube of a material similar to that of the slurry chamber inlet (58) material.

The area enclosed by the second membrane 57 and on either side of anode 51 forms anode compartment 54. Inlet means 51(a) of the same type as inlet 58 are provided in the drum 51 to allow a predetermined amount of an acid or alkali electrolyte to be added to the anode compartment 54 for the purpose previously discussed.

The fist membrane 55 and the tank 53 define a cathodic compartment 60 containing the foraminous cathode 52 spaced inwardly from the first membrane 55. The cathode compartment 60 serves as a collection chamber for water electroosmotically separated from the suspension fed to the slurry compartment 56 as well as entrained water electroosmotically removed from the solids deposit 61 electrophoretically deposited on the second membrane 47. Catholyte 63 inlet means and catholyte outlet means 64 are provided in the tank 50 to allow a predetermined amount of acid electrolyte to be added to and circulated through the cathodic compartment 60.

In operation, the suspension to be electrokinetically separated is introduced by inlet means 58 into the slurry compartment 56 causing portions of the drum 51 to become submerged in the suspension. Acid or caustic electrolyte, depending on whether an acid or dispersed clay cake is desired, is added into the anode chamber in amounts sufficient to continually contact the surfaces of the rotating anode 51. Electrolyte solution is also added by electrolyte inlet means 63 into the cathodic chamber 60 in amounts sufficient to submerge the cathode 52 and contact the lower surface of the first membrane 55. Upon activation of the rotation anode 51, the desired DC voltage is applied to the anode 51 and cathode 52. The clay suspension is then circulated through the slurry compartment 56. During the passage of the clay suspension in the slurry compartment 56 beneath the rotating anode 51, and while it is confined to the space between the second membrane 57 and the first membrane 55, the clay solids in the suspension are caused to be electrophoretically deposited on and adhere to the surface of the second membrane 57 forming a clay solids deposit 61. As the anode 51 rotates (in the direction indicated by the arrows in FIG. 2) the clay solids which have deposited on the second membrane 57 during its passage through the slurry compartment 56 are removed therefrom by any suitable removal means such as a scraper 65 which contacts the deposit at a suitable discharge point. Upon contact with the scraper 65, the removed solids are discharged into a suitable solids collection means, not shown.

The rotation of the anode 51 as well as the flow of solids suspension admitted to the slurry compartment 56 is continuous so a clean drum surface is continuously presented to the solids suspension introduced into the electroflocculation cell.

Simultaneous with the electrophoretic deposition of the solids on the second membrane 57, a portion of the water entrained in the clay deposit 61, as well as a fraction of the aqueous portion of the suspension in the slurry chamber 56, is caused to migrate electroosmotically through the first membrane 55 towards the cathode 52. Upon reaching the cathode 52, the water electroosmotically removed from the slurry chamber 56 percolates through the foraminous surface of the cathode 55 and into the lower portion of the cathode compartment 60 from which it is then removed from the cell. As the entry of water into the electrolyte in the cathodic compartment, may cause undesired dilution of the electrolyte solution contained therein, fresh electrolyte solution is continuously added and circulated through the cathodic compartment 60 to maintain the electrolyte concentration at the desired level. Electrolyte must be added to the drum continuously to replenish the water and electrolyte consumed by hydrolysis due to the electrochemical reaction at the anode.

The electrolyte which is added and circulated through the cathode compartment of the electroflocculation cell is generally comprised of a dilute weak acid solution (0.1-n 1% by weight) such as 0.1% sulfuric acid, hydrochloric acid or phosphoric acid. The choice of electrolyte which is added and circulated through the interior of the anode is dependent upon the type of solids cake desired. If an acid cake is desired, a dilute acid electrolyte, 0.1-1% by weight, such as 2% $H_3PO_4$ or 2% $H_2SO_4$ is used. If a dispersed cake is desired, a dilute caustic solution, 1-2% such as 2% NaOH is used.

In constructing the apparatus of the present invention, the materials used in the fabrication of electrodes of the electroflocculation cell may be any of the well known corrosion resistant, conductive materials, metals and alloys but for ease of maintenance, the electrodes should be resistant to chemical reaction with the electrolyte as is possible. Typical anode materials include antimony-lead, platinum and conductive oxide coatings on tantalum or titanium and the like. Cathode materials include the cathodic metals such as stainless steel and aluminum.

The semi-permeable membranes used for the first and second membranes in the construction of the electroflocculation cell may be of any suitably permeable material such as Dacron, nylon, polyesters, polypropylene having a porosity which permits an air flow rate of 0.5 to 4.0 cubic feet per minute per square inch. The rate at which the acid electrolyte is added to obtain the desired pH range of 2-7 is dependent upon the current applied. The greater the electrical current, the faster the reaction will take place and, therefore, a greater rate of acid electrolyte will have to be added to the cathode compartment to maintain the pH within a range of 2-7. If the pH goes above, metal hydroxides will be formed which will plug the filter membrane.

As shown in greater detail in FIG. 3, the membrane 70 preferred for use in the practice of the present invention is composed of Dacron and is insulated from the electrode 71 by an electrical insulator 72 such as a neoprene rubber spacer.

To achieve efficient operation of the electroflocculation cell of the present invention, it is advantageous that the spacing between the anode and the second membrane be in the order of about 1/16 inch to about ½ inch and preferably about 3/16 inch . The spacing between the cathode and the first membrane is desirably in the order of 1/16 inch to ½ inch and preferably about 3/16 inch. The spacing between the first and second membrane is in the order of 1 inch to 1½ inch.

In utilizing the electroflocculation cell of the present invention for electrokinetic separation of clay suspensions, a current density of from about 0.05 to 0.35 ampers per square inch of effective electrode area is advantageously employed. At these current densities, the applied voltage will typically range from 25 to 100 volts.

The operation of the electroflocculation cell of the present invention is illustrated by the example which follows:

EXAMPLE

To an electroflocculation cell of the type illustrated in FIG. 1 was introduced into the slurry compartments 24 and 28 a Central Georgia coating grade clay having a particle size of 92% finer than 2 microns, dispersed to minimum viscosity at 61.4 solids with tetrasodium pyrophosphate and having a pH of 6.15. A 2% electrolyte acid was employed in the anode or anolyte compartment 20 and a 0.1% electrolyte was employed in the catholyte compartments 17 and 19. The effective electrode area was 32 square inches. The spacing between the anode 11 and membranes 22 and 23 was ¼ inches, the spacing between membranes 22, 23 and the first membranes 14, 15 was 1 inch, and the spacing between the cathodes 12, 13 and first membranes 14 and 15 was 3/16 inches. The material from which the first and second membranes was formed was Dacron and had an average porosity of 1.5 cubic feet per minute of air per square inch. The anode 11 was constructed of lead, and the cathodes were constructed of a 100 mesh screen of 316 stainless steel.

A series of runs were made using different anolyte and catholyte solutions at 50 volts and varying current densities.

The clay deposition period in each run was 5 minutes. The results of these tests are recorded in Table 1 below.

TABLE I

| Anode Solution: | $H_2SO_4$ | $H_3PO_4$ | NaOH | $Na_2CO_3$ |
|---|---|---|---|---|
| Amps (avg) | 5.65 | 5.2 | 5.5 | 5.2 |
| Net Cake Wt., gms. | 495 | 490 | 380 | 375 |
| % Cake Solids | 77.2 | 77.2 | 77.6 | 77.4 |
| Slurry Solids, % | 59.1 | 59.4 | 59.8 | 59.8 |
| Slurry pH | 6.2 | 6.2 | 6.15 | 6.15 |
| kw-hr/ton | 55.8 | 51.9 | 70.4 | 67.8 |

The data in the table demonstrate that clay cakes having clay concentrations in excess of 70% are achievable with the electroflocculation cells of the present invention. Stability and viscosity properties of the filter cakes deposited on the anode were determined. The properties of these filter cakes are recorded in Table II below.

TABLE II

| PROPERTIES OF CAKE DEPOSITED ON ANODE | | | | | | |
|---|---|---|---|---|---|---|
| | 70% Viscosity | | | 10 Day Stability, 130° F | | |
| Anode Solution | Bkfld. | Herc. | pH | Bkfld. | Herc. | pH |
| $H_2SO_4$* | 240 | 18/800 | 7.15 | 600 | 18/600 | 6.4 |
| $H_3PO_4$* | 170 | 16.0 | 7.5 | 395 | 18/830 | 6.6 |
| NaOH** | 202 | 17.8 | 7.0 | 430 | 18/720 | 6.3 |
| $Na_2CO_3$** | 198 | 18/925 | 6.8 | 480 | 18/610 | 6.2 |

*0.35% $Na_2CO_3$ required to disperse EF cake.
**No additional dispersant required to disperse filter cake.

In the present invention it is particularly preferred, particularly for commercial operations, to have electrodes, both cathode and anode, consisting of Type 316 stainless steel.

It is also desirable and especially preferred to employ a 1-2% sodium hydroxide solution in the anode compartment and a 0.2% solution of sulfuric acid in the cathode compartment.

In general, solution concentrations of from 10 to 20 gm/l of sodium hydroxide or phosphoric acid are effective.

Platinum clad titanium and ruthenium — iridium — titanium oxide clad titanium anodes have also been found effective.

The anode may be the drum itself, but an electrode suitably spaced apart from and inside the drum is preferred.

Slurry flow rates, acid effluent pH, anode concentrations and related variables may, of course, be optimized to maximize production rates and cake solids.

Those skilled in the art will recognize that if a caustic solution is employed as the anode solution a dispersed cake having 70-80% solids will be obtained and if an acid is employed as the anode solution an acid or flocculated cake having 70-70% solids is obtained.

In summary of the operation and method aspects of the present invention, the suspension to be electrokinetically separated is introduced into the slurry compartment while the electrolytes are added to and circulated through the anodic and cathodic chambers of the cell, as described herein, while a direct current field is applied between the anode and cathode to cause the solid particles to be electrophoretically deposited from the suspension onto the membrane overlaying the anode concomitantly with the aqueous portion of the suspension being caused to migrate electroosmotically through a second membrane and into the cathode compartment.

In one particularly advantageous method employing the benefits of the present invention the solid particles removed from the said second membrane overlaying the anode are blended with undispersed filter cake from normal plant operations to produce a 70% solids slurry.

While the invention has been described with reference to a preferred embodiment, it will be understood by those skilled in the art that various elements may be made and equivalents may be substituted for elements thereof without departing from the scope of the invention. In addition, many modifications may be made to adapt a particular situation or material to the teachings of the invention without departing from the essential scope thereof. Therefore, it is intended that this invention not be limited to the particular embodiments disclosed as the best mode contemplated for carrying out this invention, but that the invention will include all embodiments falling within the scope of the appended claims.

What is claimed is:

1. A method of electrokinetically separating finely divided clay particles suspended in an aqueous medium comprising the steps of introducing a suspension of solid clay particles into an electrokinetic cell provided with an anode and a cathode, and two semi-permeable membranes impermeable to the clay particles separating the anode and cathode, the cathode and a first of said membranes forming a cathodic compartment in the cell, the anode and a second of said membranes forming an anodic compartment in the cell, the space between said first and second membranes constituting a slurry compartment in the cell;

directing the particle suspension into the said slurry compartment;

discharging solid particle depleted effluent from the said slurry compartment;

adding and circulating through the cathodic compartment an electrolyte having a pH of from 2-7;

adding and circulating through the anodic compartment an electrolyte to maintain a predetermined concentration therein;

applying a direct current field between the anode and cathode to cause the solid particle to be electrophoretically deposited from the suspension onto the said second membrane overlaying the anode concomitantly with the aqueous portion of the suspension being caused to migrate electroosmotically through the said first semi-permeable membrane and into the cathode compartment; and removing the solid particles from the said second membrane overlaying the anode and the water from the cathode compartment.

2. The method of claim 1 wherein the electrolyte added and circulated through the anodic compartment is about 1 to 2% acid.

3. The method of claim 2 wherein the acid solution comprises 2% $H_3PO_4$.

4. The method of claim 2 wherein the acid solution comprises 2% $H_2SO_4$.

5. The method of claim 1 wherein the electrolyte added and circulated through the anodic compartment is about 1-2% caustic.

6. The method of claim 5 wherein the electrolyte is NaOH maintained at a concentration on the order of 1 to 2% by weight.

7. The method of claim 1 wherein the electrolyte added and circulated through the cathodic compartment is about 0.1-1% acid.

8. The method of claim 7 wherein the electrolyte is 0.1% $H_2SO_4$.

9. The method of claim 1 wherein a current density of from 0.05 to 0.35 ampere per square inch of effective electrode area is delivered to the cell.

10. The method of claim 1 wherein the spacing between the first and second membranes is on the order of 1 inch to 1½ inches.

11. The method of claim 1 wherein the spacing between the cathode and said first membrane is on the order of 1/16 inch to ½ inch.

12. The method of claim 1 wherein the spacing between the anode and said second membrane is on the order of 1/16 inch to about ½ inch.

13. The method of claim 1 wherein the membranes are composed of a porous fabric having a porosity of from 0.5 to 4.0 cubic feet per minute of air per square inch of fabric.

14. The method of claim 1 wherein the aqueous suspension contains greater than 20% clay solids.

15. The method of claim 14 wherein the suspension contains 40 to 65% clay solids.

16. The method of claim 1 further including the step of blending the solid particles removed from the said second membrane overlaying the anode with undispersed filter cake from normal plant operations to produce a 70% solids slurry.

17. The method of claim 13 wherein the fabric is a material selected from a group consisting of Dacron, nylon, polyesters and prolypropylene.

18. The method of claim 1 wherein the cathode and anode are composed of Type 316 stainless steel.

19. The method of claim 1 wherein the cathode is composed of Type 316 stainless steel and the anode is composed of titanium clad with an inert, protective coating.

20. A method of electrokinetically separating finely divided clay particles suspended in an aqueous medium comprising the steps of introducing an aqueous suspension of 40-65% solids clay particles into an electrokinetic cell provided with a Type 316 stainless steel anode and a Type 316 stainless steel cathode, and two semi-permeable membranes impermeable to clay particles separating the anode and cathode and having an air porosity of from 0.5 - 4.0 cubic feet per minute per square inch, the cathode and a first of said membranes spaced from 1/16 - ½ inch apart forming a cathodic compartment in the cell, the anode and a second of said membranes spaced from 1/16 - ½ inch apart forming an anodic compartment in the cell, the space between said first and second membranes spaced from 1 - 1½ inches apart constituting a slurry compartment in the cell;

directing the particle suspension into said slurry compartment;

discharging solid particle depleted effluent from said slurry compartment;

adding and circulating through the cathodic compartment an electrolyte having a pH of from 2 - 7;

adding and circulating through the anodic compartment an electrolyte to maintain a predetermined concentration therein;

applying a direct current field producing a current density of from 0.05 - 0.35 ampere per square inch of effective electrode area between the anode and cathode to cause the solid particle to be electrophoretically deposited from the suspension onto the said second membrane overlaying the anode concomitantly with the aqueous portion of the suspension being caused to migrate electroosmotically through the said first semi-permeable membrane and into the cathode compartment; and removing the solid particles from the said second membrane overlaying the anode and the water from the cathode compartment.

21. The method of claim 20 wherein the electrolyte added and circulated through the anodic compartment is about 1 to 2% acid.

22. The method of claim 21 wherein the acid solution comprises 2% $H_3PO_4$.

23. The method of claim 21 wherein the acid solution comprises 2% $H_2SO_4$.

24. The method of claim 20 wherein the electrolyte added and circulated through the anodic compartment is about 1-2% caustic.

25. The method of claim 24 wherein the electrolyte is NaOH maintained at a concentration on the order of 1 to 2% by weight.

26. The method of claim 20 wherein the electrolyte added and circulated through the cathodic compartment is about 0.1-1% acid.

27. The method of claim 26 wherein the electrolyte is 0.1% $H_2SO_4$.

* * * * *

UNITED STATES PATENT OFFICE
CERTIFICATE OF CORRECTION

Patent No. 4,048,038　　　　　　　　　Dated September 13, 1977

Inventor(s) Albert C. Kunkle

It is certified that error appears in the above-identified patent and that said Letters Patent are hereby corrected as shown below:

Column 5, line 22, following "solution", "(0.1-n 1%" should be -- (0.1 - 1% --.

Column 7, line 21, "70-70%" should be -- 70-80% --.

Column 8, Claim 17, line 66, "prolypropylene" should be -- polypropylene --.

Signed and Sealed this

Twenty-seventh Day of December 1977

[SEAL]

Attest:

RUTH C. MASON
*Attesting Officer*

LUTRELLE F. PARKER
*Acting Commissioner of Patents and Trademarks*